J. W. DONNENWIRTH.
PROCESS FOR FORMING FABRIC LINED RUBBER ARTICLES.
APPLICATION FILED APR. 29, 1916.

1,226,481.  Patented May 15, 1917.
2 SHEETS—SHEET 1.

Witness  Inventor
J. H. Bishop  John W. Donnenwirth.
By F. W. Bond.
Attorney

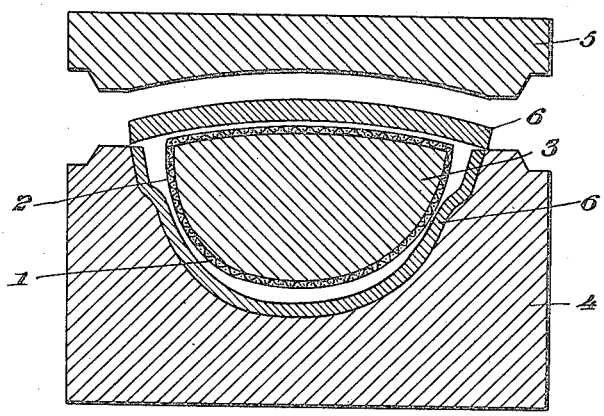
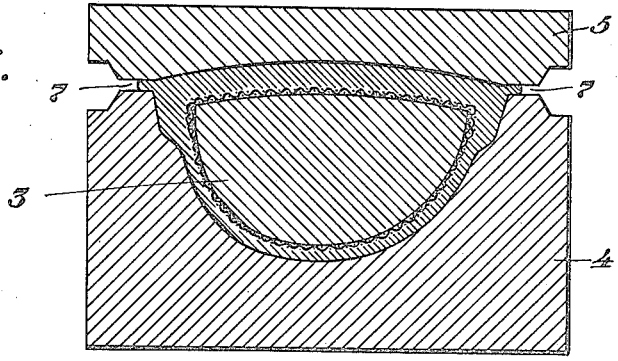
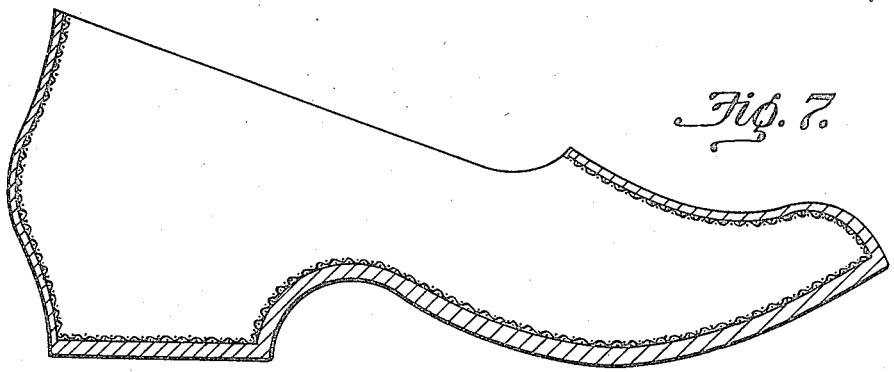

UNITED STATES PATENT OFFICE.

JOHN W. DONNENWIRTH, OF AKRON, OHIO.

PROCESS FOR FORMING FABRIC-LINED RUBBER ARTICLES.

1,226,481. Specification of Letters Patent. Patented May 15, 1917.

Application filed April 29, 1916. Serial No. 94,367.

*To all whom it may concern:*

Be it known that I, JOHN W. DONNENWIRTH, a citizen of the United States, residing at Akron, in the county of Summit and State of Ohio, have invented a new and useful Process for Forming Fabric-Lined Rubber Articles, of which the following is a specification.

The present invention relates to a process for forming fabric lined rubber articles such as overshoes, boots, gloves, water bags and the like.

The present method of making fabric lined articles of the character referred to is both expensive and at the same time tedious and slow, and the results obtained are generally more or less unsatisfactory. The greater part of the work in the present method of forming these articles is done by hand, adding to the cost and time required in the manufacture of the articles.

In the present method now in use of forming fabric lined rubber articles the rubber is "frictioned" upon the sheets of fabric by hand, this being a tedious and expensive operation.

In the method to which the present application relates, sheets of stockinet are first coated with a very thin coat of gum or rubber upon one side of the stockinet by passing the same through calender rolls or by any other suitable means of coating. The gum coated fabric is then cut into pieces of the proper size and shape to produce the article desired and placed, coated side out, around a cold core. Sheets of rubber are then placed around the interior of the mold with which said core is used, the core being placed within the mold and pressure and heat applied to the mold. The rubber sheets within the mold are reduced to a liquid state by the heat applied thereto and the pressure applied to the mold causes the liquid rubber to flow freely within the mold assuming the proper shape, suitable channels or spaces being provided to allow any superfluous rubber to overflow from the mold. As the finished article cools ribs or ridges are formed thereon where the rubber has overflowed from the mold and these ridges may be easily removed by buffing. By this process there is no danger of tearing the fabric after placing the same upon the core, and no danger of burning or scorching the same as the core around which the fabric is placed is cold and the gum coated outer surface of the fabric protects the fabric from the heat applied to the mold.

The objects of the present invention are, to provide a process whereby fabric lined rubber articles of wearing apparel and the like may be easily and quickly and inexpensively formed.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

In the drawings:

Fig. 5 is a sectional view through the mold showing the core placed therein and the sheets of rubber placed in position.

Fig. 6 is a section through the mold after the pressure and heat have been applied thereto.

Fig. 7 is a sectional view through an overshoe formed in accordance with the present invention.

Similar numerals of reference indicate corresponding parts throughout the several figures of the drawing.

Figure 1:
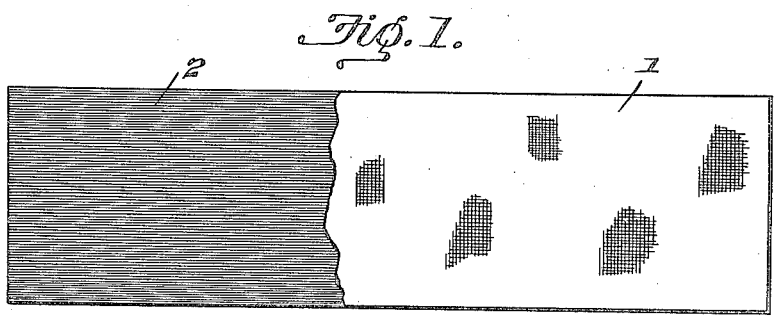
Figure 1 is a view of a portion of the stockinet which is used to line the gum coated articles, the gum coating being shown upon a part of the fabric.
Figures 2, 3:
Fig. 2 is a sectional view of the stockinet before the gum coating is applied.
Fig. 3 is a similar view after the gum coating has been applied.
Figure 4:
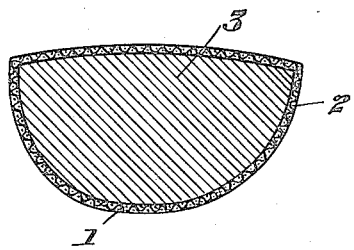
Fig. 4 is a sectional view through the core showing the gum coated stockinet placed thereon.

Referring more especially to the accompanying drawings, the numeral 1 represents a sheet of stockinet or similar fabric to which is applied a thin coating 2 of gum by any suitable means such as passing the fabric betwen rolls or painting the gum thereon. The stockinet after being coated as shown in Fig. 3 is cut into pieces of the proper size and shape to form the desired article and placed around a core 3 as shown in Fig. 4 the adjoining edges of the fabric being overlapped and stuck together in any suitable manner.

The core 3 is then placed within a mold such as shown in Fig. 5 comprising the members 4 and 5. Sheets of rubber 6 of the proper shape and size are placed around the interior of the mold as shown in Fig. 5, the core 3 which is wrapped with the gum coated fabric being placed therein. The core 3 upon which the gum coated stockinet is placed is cold, thereby preventing any scorching of the fabric and the gum coating upon the fabric prevents the same from being torn as pressure is applied to the mold.

The mold is so constructed that a narrow channel 7 is provided between the opposing mold sections. After the parts have been placed in the position shown in Fig. 5 pressure is exerted upon the mold sections bringing them together and at the same time heat, preferably steam is applied to the mold sections, causing the rubber sheets within the mold to melt and flow freely filling the mold and forming any shape or design desired within the mold, any superfluous rubber overflowing through the channels 7. The gum coating 2 which has been applied to the fabric protects the fabric from being scorched or burnt from the heat applied to the molds and said gum coating is melted forming a solid mass with the rubber which has been placed in the mold, thus producing an overshoe or other article of one solid mass of rubber provided with a fabric lining. When the article has been removed from the mold and cooled the ribs or ridges formed thereon by the superfluous rubber which has flowed into the channels 7 may be easily buffed, producing a smooth and even surface upon the finished article. The articles thus made are in a solid mass of rubber having no seams, the pressure applied to the mold having caused the rubber to become a compact mass, thus eliminating any possibility of leakage and rendering the article impervious to air, acid, electricity or water. By this process it is possible to produce a better finish than can be obtained by the present method of manufacturing fabric lined rubber articles, thus making the goods not only more serviceable than is possible under the processes now in use, but also more artistic in appearance. The articles may also be produced at considerably less expense with this process than is possible at present, owing to the fact that the manual labor employed in the present process is very small compared to the processes at present in use.

Although the drawings and above specification disclose the best mode in which I have contemplated embodying my invention I desire to be not limited to the details of such disclosure, for in the further practical application of my invention, many changes in form and construction may be made, as circumstances require or experience suggests, without departing from the spirit of the invention within the scope of the appended claims.

I claim:

1. The process of manufacturing a molded rubber, fabric lined article which consists in applying to the fabric lining a thin coating of rubber, then placing the rubber coated fabric upon a core, then placing the core within a mold having sheets of rubber placed around the interior thereof and then applying pressure and heat to the mold.

2. The process of manufacturing a molded rubber, fabric lined article which consists in applying to the fabric lining a thin coating of rubber, then placing the rubber coated fabric upon a core, then placing sheets of rubber around the interior of a mold provided with an overflow channel then placing the core within the mold and then applying pressure and heat to the mold causing the sheets of rubber and the gum coating upon the fabric to melt and form a solid mass filling the mold, the superfluous rubber being forced into the overflow channel.

3. The process of manufacturing a molded rubber, fabric lined article which consists in applying to the fabric lining a thin coating of rubber, then placing the rubber coated fabric upon a cold core, the coated surface being placed upon the outside, then placing sheets of rubber around the interior of a mold provided with an overflow channel, then placing the core within the mold and then applying pressure and heat to the mold, causing the sheets of rubber and the gum coating upon the fabric to melt and form a solid mass, filling the mold, the superfluous rubber being forced into the overflow channel.

In testimony that I claim the above, I have hereunto subscribed my name.

JOHN W. DONNENWIRTH.